(12) United States Patent
Mizoguchi

(10) Patent No.: US 11,580,414 B2
(45) Date of Patent: Feb. 14, 2023

(54) FACTOR ANALYSIS DEVICE, FACTOR ANALYSIS METHOD, AND STORAGE MEDIUM ON WHICH PROGRAM IS STORED

(71) Applicant: NEC Corporation, Tokyo (JP)

(72) Inventor: Takehiko Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1185 days.

(21) Appl. No.: 16/086,036

(22) PCT Filed: Mar. 17, 2017

(86) PCT No.: PCT/JP2017/010833
§ 371 (c)(1),
(2) Date: Sep. 18, 2018

(87) PCT Pub. No.: WO2017/164095
PCT Pub. Date: Sep. 28, 2017

(65) Prior Publication Data
US 2020/0293909 A1    Sep. 17, 2020

(30) Foreign Application Priority Data
Mar. 23, 2016   (JP) .............................. JP2016-057937

(51) Int. Cl.
*G06N 5/02*       (2006.01)
*G06F 16/906*     (2019.01)
*G06F 16/9035*    (2019.01)

(52) U.S. Cl.
CPC ............. *G06N 5/02* (2013.01); *G06F 16/906* (2019.01); *G06F 16/9035* (2019.01)

(58) Field of Classification Search
CPC ...... G06N 5/02; G06F 16/906; G06F 16/9035
(Continued)

(56) References Cited

U.S. PATENT DOCUMENTS

2007/0094196 A1\* 4/2007 Shirai ................... G06Q 50/04
  706/46
2007/0288105 A1\* 12/2007 Sekine .................. G05B 17/02
  700/52

(Continued)

FOREIGN PATENT DOCUMENTS

JP    2002-110493 A    4/2002
JP    2007-329415 A    12/2007

(Continued)

OTHER PUBLICATIONS

Baykasoğlu, Adil, et al., "Development of a novel multiple-attribute decision making model via fuzzy cognitive maps and hierarchical fuzzy TOPSIS", Information Sciences, vol. 301, Apr. 2015, pp. 75-98.\*

(Continued)

*Primary Examiner* — Robert Stevens
(74) *Attorney, Agent, or Firm* — Sughrue Mion, PLLC

(57) ABSTRACT

Provided is a factor analysis device capable of obtaining more useful knowledge relating to the degree of influence of pieces of data. A factor analysis device according to one embodiment of the present invention is provided with: a classification unit for classifying a type of data into a first group or a second group; and an influence degree calculation unit for calculating, as the degree of influence on target data, the degree of influence of the data of the type classified into the second group on the data of the first group type.

18 Claims, 12 Drawing Sheets

(58) Field of Classification Search
USPC .......................................................... 706/46
See application file for complete search history.

(56) References Cited

U.S. PATENT DOCUMENTS

| | | | | |
|---|---|---|---|---|
| 2009/0089023 A1* | 4/2009 | Watanabe | ............... | G06Q 10/04 |
| | | | | 703/2 |
| 2012/0239179 A1* | 9/2012 | Hanawa | ................ | G06Q 50/04 |
| | | | | 700/109 |
| 2018/0260726 A1* | 9/2018 | Takada | ................... | G06N 7/005 |

FOREIGN PATENT DOCUMENTS

| JP | 2008-003866 A | 1/2008 |
|---|---|---|
| JP | 2009-199533 A | 9/2009 |
| JP | 2009-258890 A | 11/2009 |
| JP | 2011-150496 A | 8/2011 |
| JP | 2012-093905 A | 5/2012 |
| JP | 2015-154845 A | 8/2015 |
| JP | 2015-210788 A | 11/2015 |
| WO | 2015/136586 A1 | 9/2015 |

OTHER PUBLICATIONS

Niaki, Seyed Taghi Akhavan, et al., "Designing a multivariate-multistage quality control system using artificial neural networks", International Journal of Production Research, Jan. 2009, 32 pages.*
International Search Report of PCT/JP2017/010833 dated Jun. 6, 2017 [PCT/ISA/210], 7 pages.
Japanese Office Action for JP Application No. 2018-507295 dated Feb. 24, 2021 with English Translation, 7 pages.
Nomura Yosuke et al. "Evaluation of Relationship between Network Performance and Web Usability considering TCP/IP layer model of QoS with Path Analysis", Technical research report in the Institute of Electronics, Information and Communication Engineers, IN2013-117-IN2013-142, Information Networks, vol. 113, No. 389, pp. 27-32, Jan. 16, 2014, Japan.
International Search Report of PCT/JP2017/010833 dated Jun. 6, 2017 [PCT/ISA/210], 4 pages.

* cited by examiner

| TIME SERIES 1 | |
|---|---|
| TIME | OBSERVED VALUE |
| X1 | 4.31 |
| X2 | 4.27 |
| X3 | 4.56 |
| ... | ... |

Fig. 4

| CLASS | TIME SERIES | | | | | | | | | |
|---|---|---|---|---|---|---|---|---|---|---|
| | TIME SERIES 0 | | TIME SERIES 1 | | TIME SERIES 2 | | TIME SERIES 3 | | TIME SERIES 4 | |
| | TIME | OBSERVED VALUE | TIME | OBSERVED VALUE | TIME | OBSERVED VALUE | TIME | OBSERVED VALUE | TIME | OBSERVED VALUE |
| | ... | | ... | | ... | | ... | | ... | |
| CLASS | RESPONSE TIME SERIES | EXPLANATORY TIME SERIES | EXPLANATORY TIME SERIES | EXPLANATORY TIME SERIES | EXPLANATORY TIME SERIES |
| GROUP | | FIRST GROUP | FIRST GROUP | SECOND GROUP | SECOND GROUP |
| REPRESENTATIVE TIME SERIES | | Y | N | | |

Fig. 5

| RESPONSE TIME SERIES | | EXPLANATORY TIME SERIES | | | | |
|---|---|---|---|---|---|---|
| | | FIRST GROUP | | | SECOND GROUP | |
| | | REPRESENTATIVE TIME SERIES | | | | |
| TIME SERIES 0 | ... | TIME SERIES 1 | TIME SERIES 2 | ... | TIME SERIES 3 | TIME SERIES 4 | ... |
| TIME \| OBSERVED VALUE | | TIME \| OBSERVED VALUE | TIME \| OBSERVED VALUE | | TIME \| OBSERVED VALUE | TIME \| OBSERVED VALUE |
| ... | | ... | ... | | ... | ... |

Fig. 8

| RANK | TIME SERIES NUMBER | INFLUENCE DEGREE |
|---|---|---|
| 1 | 8 | 1.898882 |
| 2 | 22 | 0.044360 |
| 3 | 42 | 0.001766 |
| 4 | 12 | 0.001392 |
| 5 | 39 | 0.000719 |
| 6 | 25 | 0.000592 |
| 7 | 4 | 0.000580 |
| ... | ... | ... |

Fig. 9

ANALYSIS RESULT

| RANK | TIME SERIES NUMBER | SHAPE | INFLUENCE DEGREE | SUGGESTED IMPROVEMENT |
|---|---|---|---|---|
| 1 | 8 | | 1.898882 | INCREASE OSCILLATION WIDTH |
| 2 | 22 | | 0.044351 | DECREASE OSCILLATION WIDTH |
| 3 | 42 | | 0.001757 | NO INFLUENCE |
| 4 | 13 | | 0.001757 | NO INFLUENCE |
| 5 | 39 | | 0.001383 | NO INFLUENCE |
| 6 | 24 | | 0.00071 | NO INFLUENCE |
| 7 | 28 | | 8.62E-06 | NO INFLUENCE |
| 8 | 48 | | 8.62E-06 | NO INFLUENCE |
| 9 | 50 | | 8.62E-06 | NO INFLUENCE |

FACTOR ANALYSIS DEVICE, FACTOR ANALYSIS METHOD, AND STORAGE MEDIUM ON WHICH PROGRAM IS STORED

CROSS REFERENCE TO RELATED APPLICATIONS

This application is a National Stage of International Application No. PCT/JP2017/010833, filed Mar. 17, 2017, claiming priority based on Japanese Patent Application No. 2016-057937, filed Mar. 23, 2016, the entire disclosure of which is incorporated herein by reference.

TECHNICAL FIELD

The present disclosure relates to a factor analysis device, a factor analysis method, and a program, and particularly, relates to a factor analysis device, a factor analysis method, and a program that specify an explanatory variable contributing to a change in a value of a response variable.

BACKGROUND ART

As a technique for clarifying a relationship between a response variable and an explanatory variable and for specifying an explanatory variable having strong influence on a change in a value of the response variable, a statistical approach such as a regression analysis is widely used in quality management, system management, and the like in a manufacturing scene of an article.

For example, in a process of manufacturing an article, a statistical approach in which an observed value is acquired and analyzed for various items that can be observed by using a measuring instrument such as a sensor is used in order to specify a factor that has influence on quality of a manufactured product (PTLs 1 and 2). When it is considered that a plurality of items have influence on quality, a multivariate analysis is generally performed in which an item representing quality is set as a response variable and a plurality of items are set as explanatory variables. An analyzer is able to know a degree of influence that each explanatory variable has on a change in a value of a response variable (in other words, an influence degree of each explanatory variable), by calculating a contribution rate, a degree of association, and the like of respective explanatory variables through a multivariate analysis.

Incidentally, in a process such as a manufacturing process, an item having strong influence on an index such as quality and production efficiency may be an item that is already known as having strong influence, or may be an item a value of which is uncontrollable. Thus, it is important to obtain knowledge, regarding also an item other than an item having strong influence, of what kind of or how much influence the item has on the index.

However, in general, in a multivariate analysis approach, when an item having remarkably strong influence on a change in a value of a response variable is included in an explanatory variable, a contribution rate of the variable (a degree to which the explanatory variable determines the value of the response variable) is calculated to be large. As a result, a contribution rate of another explanatory variable is calculated to be relatively small, which may lead to determination that even an explanatory variable (effect factor) having strong influence on a value of a response variable is not an effect factor.

As described above, in a factor analysis, there may exist an effect factor that is difficult to find through an analysis performed by setting all items as explanatory variables. In regard to this problem, even when only an item having no remarkably strong influence on a change in a value of a response variable is used for an analysis, there is a possibility that a function as an analysis result does not sufficiently fit, or a possibility that a precise analysis cannot be performed, and thus an effect factor cannot be accurately specified.

PTLs 3 and 4 describe a technique of finding an explanatory variable that is an effect factor but is hidden by a large effect factor due to a low contribution rate. This technique performs a multiple regression analysis in which a multiple regression equation is calculated by using an explanatory variable that has a high contribution rate with respect to a response variable and in which a difference between a predicted value and a measured value of the response variable obtained by calculation is newly set as a response variable, by using a remaining explanatory variable as a new explanatory variable.

PTL 5 describes a technique of visualizing, regarding multiple items in a manufacturing process, a hierarchical relationship between the items by performing a multiple regression analysis between the items in consideration of measurement order or process order.

CITATION LIST

Patent Literature

[PTL 1] Japanese Unexamined Patent Application Publication No. 2009-258890
[PTL 2] Japanese Unexamined Patent Application Publication No. 2002-110493
[PTL 3] Japanese Unexamined Patent Application Publication No. 2007-329415
[PTL 4] U.S. Unexamined Patent Application Publication No. 2007/0288105 specification
[PTL 5] Japanese Unexamined Patent Application Publication No.

SUMMARY OF INVENTION

Technical Problem

The technique described in PTLs 3 and 4 is a technique in which an explanatory variable having a small association degree with each explanatory variable having a large contribution rate is easily specified as being a hidden effect factor. However, an explanatory variable having a large association degree with any of explanatory variables having a large contribution rate is likely to be hidden and is not easily found even by using this technique.

The technique described in PTL 5 calculates an influence degree between respective items, but performs a multiple regression analysis by setting all items to be candidates for an effect factor as explanatory variables. Thus, an influence degree tends to be underestimated for an item having a strong association degree with an item having strong influence. In particular, it is considered that association is hardly calculated accurately for a set of explanatory variables in no temporal order and in no clear causal relationship.

Therefore, there is a need for a method that is different from the above-described PTLs and is capable of specifying an effect factor that may be hidden by a strong effect factor.

Further, a factor an influence degree of which is determined to be large through an analysis may be a value of an uncontrollable item in improving the index. In this case, it is crucial to know how much each non-uncontrollable item contributes to the uncontrollable item in controlling a value of a response variable.

In view of the above, one object of the present invention is to provide a factor analysis device, a factor analysis method, and a program capable of obtaining more useful knowledge relating to an influence degree of each piece of data in a multivariate analysis.

Solution to Problem

A factor analysis device according to one aspect of the present invention includes: classification means for classifying a type of data into a first group or a second group; and influence degree calculation means for calculating, as an influence degree on response data, an influence degree of data of the type classified into the second group, on data of the type in the first group.

A factor analysis method according to one aspect of the present invention includes: classifying a type of data into a first group or a second group; and calculating, as an influence degree on response data, an influence degree of data of the type classified into the second group, on data of the type in the first group.

A program according to one aspect of the present invention causes a computer to execute: classification processing for classifying a type of data into a first group or a second group; and influence degree calculation processing for calculating, as an influence degree on response data, an influence degree of data of the type classified into the second group, on data of the type in the first group.

Advantageous Effects of Invention

The present invention enables obtaining more useful knowledge relating to an influence degree of each piece of data.

BRIEF DESCRIPTION OF DRAWINGS

FIG. 4 is a diagram illustrating an example of a form of data storage in a data storage unit according to the first example embodiment.

FIG. 5 is a diagram illustrating another example of a form of data storage in the data storage unit according to the first example embodiment.

FIG. 8 is a diagram illustrating an example of a table of an influence degree of each explanatory time series in a second group on a change in a value of a representative time series, the influence degree being saved in an influence degree storage unit according to the first example embodiment.

FIG. 9 is a diagram illustrating an example of an analysis result output from the influence degree storage unit by an output device according to the first example embodiment.

EXAMPLE EMBODIMENT

First Example Embodiment

A first example embodiment of the present invention is described in detail.

In the present example embodiment, a case is described as an example in which a factor analysis device is applied for quality management in a manufacturing process of a certain product. However, an application of the present invention is not limited to analysis and quality management in a manufacturing process.

<Configuration>

Figure 1:
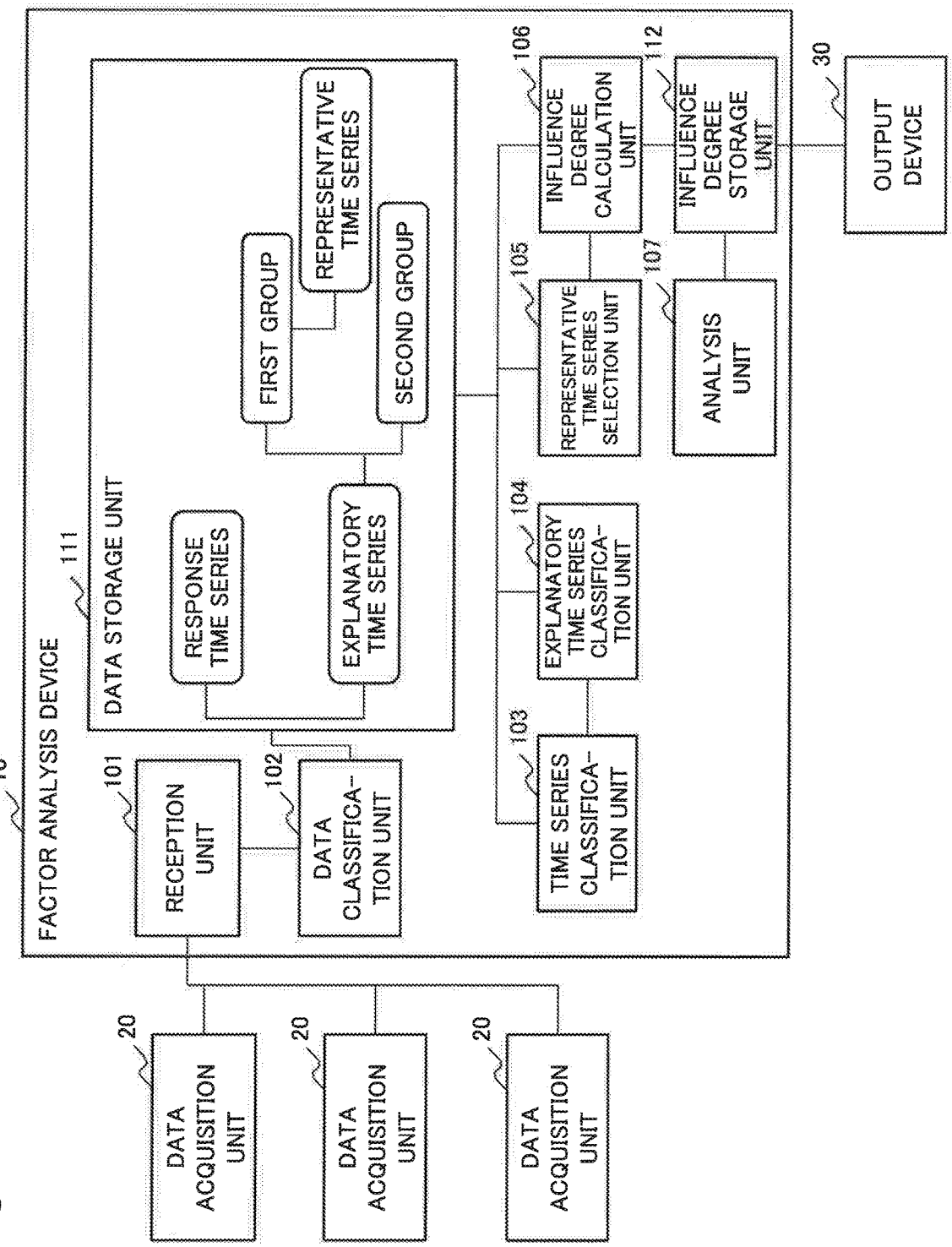
FIG. 1 is a block diagram illustrating a configuration of a factor analysis device according to a first example embodiment of the present invention.

FIG. 1 is a block diagram illustrating a configuration example of a factor analysis device 10 according to the present example embodiment. The factor analysis device 10 is communicably connected with one or more data acquisition units 20.

The data acquisition unit 20 acquires a value relating to various items in a manufacturing process by measurement, for example. The data acquisition unit 20 may acquire a value that is set for various items in a product process. The data acquisition unit 20 transmits the acquired value to the factor analysis device 10.

An item to be a target for which a value is acquired is classified into a quality index or a manufacturing condition of a manufactured product. A quality index is an item that indicates quality of a product or evaluation for a product. Determination as to what kind of an item is set as a quality index may be made from various points of view depending on a feature of a product. Examples of an item classified into a quality index include electrical conductivity, water resistance and thermal resistance of a product, and a product state that indicates whether or not a product works normally. A value relating to an item of a quality index may be a quantitative value that can be expressed by magnitude of a numerical value, and may be a qualitative value such as "normal/abnormal". A manufacturing condition is an item that indicates a factor possibly affecting a value of a quality index of a product. Examples of an item classified into a manufacturing condition include, for example, temperature, pressure, a gas flow rate, voltage, viscosity of a material, or an operation state that indicates whether or not a specific operation is performed. An item indicating a manufacturing condition may be selected from among any items for which a value can be acquired. A manufacturing condition may be a quantitative value indicated by a numerical value, or may be a qualitative value such as "present/absent".

The data acquisition unit 20 may acquire a value relating to respective items by means of a method of measurement using, for example, a sensor, or by means of a method of determination or setting made by a maintenance person. For example, the data acquisition unit 20 may include a sensor, and may acquire a value relating to an item by using the sensor. For example, the data acquisition unit 20 may include an input interface, and may acquire, as a value relating to the item, a result of determination or setting input by the maintenance person. Alternatively, when a software program and the like can change or acquire a manufacturing condition, the data acquisition unit 20 may acquire a value relating to the manufacturing condition from the software program and the like. Further, a plurality of data acquisition units 20 may exist, or a single data acquisition unit 20 may acquire values relating to a plurality of items.

Hereinafter, a value acquired by the data acquisition unit 20 is referred to as an observed value.

In the present example embodiment, the data acquisition unit 20 transmits an observed value to the factor analysis device 10, for example, upon acquiring the observed value, or on a suitable timing (for example, every predetermined time). The data acquisition unit 20 may associate an observed value with time at which the observed value is acquired.

Accordingly, for example, a later-described data classification unit 102 of the factor analysis device 10 according to the present example embodiment is able to associate observed values of a plurality of items with each other on the basis of information about time. When the data acquisition unit 20 transmits an observed value as soon as acquiring the observed value, the data classification unit 102 of the factor analysis device 10 may associate time at which the observed value is received with the observed value.

Figures 2, 3:
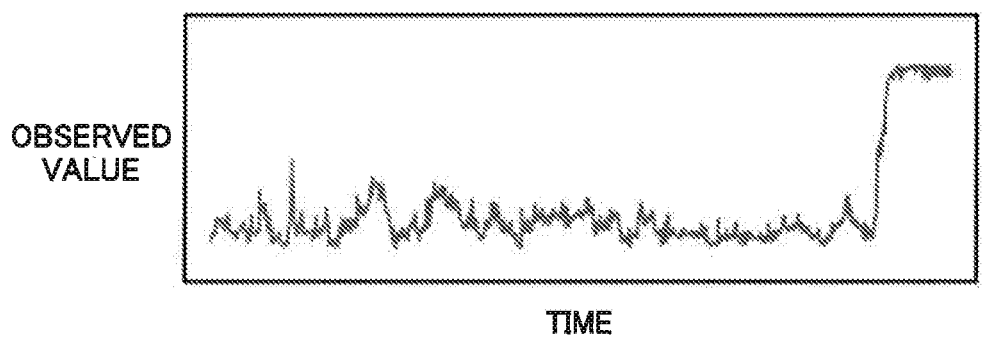
FIG. 2 is a diagram representing an example of a time series used in the first example embodiment.
FIG. 3 is an example of a time series visualized as a graph.

In the present example embodiment, a piece of data in which an acquired observed value is arranged in time order is referred to as a "time series". FIG. 2 is a diagram representing an example of a time series (time series 1) of a certain item. As in the example illustrated in FIG. 2, for example, the data classification unit 102 records arrays of time at which an observed value is acquired and the observed value associated with the time of acquisition, in a data storage unit 111 as a time series. FIG. 3 is an example of a time series visualized as a graph.

In the present example embodiment, a time series of an item pertaining to a quality index described above is referred to as a "response time series", and a time series of an item pertaining to a manufacturing condition described above is referred to as an "explanatory time series". In other words, a "response time series" is a time series for which an analyzer attempts to analyze a factor influencing a change in a value thereof. An "explanatory time series" is a time series pertaining to an item that is considered as possibly influencing a change in a value of a "response time series".

The factor analysis device 10 receives an observed value acquired by the data acquisition unit 20. The factor analysis device 10 may be installed in, for example, a manufacturing line, and may acquire an observed value directly from the data acquisition unit 20. The factor analysis device 10 may be mounted on a remote server. When the factor analysis device 10 is mounted on a remote server, for example, an analyzer may transmit an observed value acquired at the data acquisition unit 20, from a terminal installed in a manufacturing line to the factor analysis device 10 on the server via a communication network.

The factor analysis device 10 is implemented by, for example, a memory on which a program is loaded and a central processing unit (CPU) that executes processing in accordance with the program. Further, the factor analysis device 10 may be implemented by a computer that operates by control of a CPU based on a program.

A configuration of the factor analysis device 10 is described with reference to FIG. 1. The factor analysis device 10 includes a reception unit 101, the data classification unit 102, a time series classification unit 103, an explanatory time series classification unit 104, a representative time series selection unit 105, an influence degree calculation unit 106, an analysis unit 107, the data storage unit 111, and an influence degree storage unit 112. The data classification unit 102, the time series classification unit 103, the explanatory time series classification unit 104, the representative time series selection unit 105, the influence degree calculation unit 106, and the analysis unit 107 are implemented by, for example, a CPU that executes processing in accordance with program control. The data storage unit 111 and the influence degree storage unit 112 are implemented by a storage device such as a random access memory (RAM), for example. The storage device constituting the data storage unit 111 and the influence degree storage unit 112 may be singular or plural.

The reception unit 101 receives an observed value acquired by the data acquisition unit 20.

The data classification unit 102 identifies to which item an observed value acquired by the reception unit 101 relates, and saves the acquired observed value in the data storage unit 111 as an observed value constituting a time series of the identified item. For example, an observed value may be associated, by the data acquisition unit 20, with information enabling identification of an item. The data classification unit 102 adds the observed value to a time series of an item identified by the information. Alternatively, for example, the data classification unit 102 may recognize from which data acquisition unit 20 a received observed value is transmitted, and may add the observed value to a time series of an item associated with recognized information. The data classification unit 102 may recognize by which sensor a received observed value is observed, and may add the observed value to a time series of an item associated with recognized information. The data classification unit 102 generates a time series item by item, by accumulating an observed value in the data storage unit 111 in this manner. As described, an item can be said as expressing a type of a time series. In each example embodiment of the present invention, an item is sometimes denoted by a "type". Note that, the data classification unit 102 may generate a time series, and thereafter may save the generated time series in the data storage unit 111.

The data storage unit 111 stores, for each item, an observed value that constitutes a time series.

FIG. 4 is a diagram illustrating an example of a form of storage of an observed value in the data storage unit 111. The data storage unit 111 stores, for each item, a value of an observed value received from the data classification unit 102 together with time at which the value is observed. The observed value forms a time series by being stored in order of time at which the value is observed.

The data storage unit 111 stores each of time serieses in association with class information of the time series. Class information is information indicating that a time series is a response time series or an explanatory time series. Class information of each time series is determined by the time series classification unit 103 to be described later. In the example illustrated in FIG. 4, a value of "Class" represents class information of a time series. Referring to a column of "Class" on the table illustrated in FIG. 4, it can be seen that time series 0 is a response time series and time series 1 to 4 are explanatory time series.

The data storage unit 111 stores each explanatory time series in association with group information. Group information is information indicating that an explanatory time series belongs to a first group or belongs to a second group. Group information is determined by the explanatory time series classification unit 104 to be described later. In the example illustrated in FIG. 4, a value of "Group" represents a group to which a time series belongs. Referring to a column of "Group" on the table illustrated in FIG. 4, it can be seen that time series 1 and 2 belong to a first group and time series 3 and 4 belong to a second group.

The data storage unit 111 stores each of explanatory time serieses belonging to a first group in association with information indicating whether or not the time series is a representative time series. A representative time series is a time series selected from explanatory time series by the representative time series selection unit 105. Information indicating whether or not a time series is a representative time series is determined by the representative time series selection unit 105 to be described later. In the example illustrated in FIG. 4, a time series that is a representative time series is associated with "Y", and a time series that is not a representative time series is associated with "N", in a column of "Representative time series". In the example illustrated in FIG. 4, it can be seen that time series 1 is a "representative time series".

FIG. 5 is a diagram illustrating another example of a form of data storage in the data storage unit 111. In the example illustrated in FIG. 5, time series 0 is included in a column of response time series, and time series 1 to 4 are included in a column of explanatory time series. The column of explanatory time series is divided into columns of first group and second group. The column of first group is divided into a column of representative time series and a column of non-representative time series. In the example illustrated in FIG. 5, it can be seen that time series 0 is a response time series, time series 1 and 2 are explanatory time series in a first group, time series 3 and 4 are explanatory time series in a second group. Further, it can be seen that time series 1 is a representative time series.

FIGS. 4 and 5 are examples, and an aspect of storage of a time series is not limited to these examples. The data storage unit 111 may store each time series in such a manner that information such as a class and a group can be seen.

The time series classification unit 103 classifies a time series in the data storage unit 111 into a response time series or an explanatory time series. For example, when a certain time series is a time series relating to a product condition, the time series classification unit 103 determines that the time series is an explanatory time series. For determination, an observed value may be associated, by the data acquisition unit 20, with information enabling determination of a class of a time series. Then, the time series classification unit 103 associates a time series with class information, as illustrated in FIG. 4, for example. Alternatively, the time series classification unit 103 may arrange a time series in an area associated with class information, as illustrated in FIG. 5.

The explanatory time series classification unit 104 classifies an explanatory time series into a first group or a second group. Specifically, the explanatory time series classification unit 104 determines, for each explanatory time series, which one of a first group or a second group the explanatory time series belongs to.

In the present example embodiment, it is assumed that a criterion for classifying an explanatory time series into a first group or a second group is whether or not the explanatory time series is specified as being apparently an effect factor for a response time series. Whether or not an explanatory time series is apparently an effect factor for a response time series may be determined by, for example, either one or both of an analyzer and the explanatory time series classification unit 104.

For example, when it is known to an analyzer that an explanatory time series has influence on a response time series, the analyzer may classify the explanatory time series. In this case, the analyzer specifies, for example, an explanatory time series that is known for having strong correlation with a response time series as a result of a past analysis and the like, as being an explanatory time series that is apparently an effect factor. Then, the analyzer may indicate the specified explanatory time series to the explanatory time series classification unit 104 via an input/output interface and the like of the factor analysis device 10. The explanatory time series classification unit 104 classifies the indicated explanatory time series into a first group.

The explanatory time series classification unit 104 may determine whether or not each explanatory time series is apparently an effect factor for a response time series. The explanatory time series classification unit 104 may specify an explanatory time series that is an effect factor for a response time series, from among explanatory time series that have not been specified by an analyzer. The explanatory time series classification unit 104 may specify an explanatory time series that is apparently an effect factor for a response time series, on the basis of, for example, a preliminarily defined rule.

For example, the explanatory time series classification unit 104 specifies an explanatory time series satisfying a preliminarily defined condition, as being an explanatory time series that is apparently an effect factor for a response time series. A preliminarily defined condition may be set for the factor analysis device 10 by an analyzer or the like in advance.

The condition described above may be a condition for an attribute of an explanatory time series. An attribute may be, for example, any one or a plurality of a name (label) or an identifier imparted to the data acquisition unit 20 having acquired data of an explanatory time series, a type of a used sensor, a name imparted to a sensor, a type (item) of data acquired as a time series, and a name (item name) imparted to the data. In this case, for example, the data classification unit 102 may impart an attribute to a time series such as an explanatory time series.

The condition may be expressed by a value of an attribute. In that case, the explanatory time series classification unit 104 may specify an explanatory time series having a value of an attribute matching a condition, as being an explanatory time series that is apparently an effect factor. A condition may be a value of an attribute expressed by a regular expression. In that case, the explanatory time series classification unit 104 may specify an explanatory time series having a value of an attribute matching a condition, as being an explanatory time series that is apparently an effect factor. For example, when a name of a sensor is designated as "* flow rate *" as a condition, a time series of data acquired by a sensor a name of which is, for example, "Ultrasonic flow rate meter" is specified as being an explanatory time series that is apparently an effect factor.

A plurality of conditions may be present. In that case, the explanatory time series classification unit 104 may specify an explanatory time series having a value of an attribute matching any one of the conditions, as being an explanatory time series that is apparently an effect factor. Further, the explanatory time series classification unit 104 may hold a plurality of conditions in a form of a table. An analyzer may enter, on the factor analysis device 10, a plurality of conditions expressed in a form of a table. A condition may be represented by a plurality of logical expressions.

Determination that an explanatory time series is apparently an effect factor for a response time series may be made on the basis of calculation performed by the explanatory time series classification unit 104, or may be made on the basis of a result of observation.

For example, when it is observed that a value of a response time series changes corresponding to a change in a value of an explanatory time series, the explanatory time series classification unit 104 may specify the explanatory time series as being an effect factor for the response time series. For example, when an amount or a ratio of a change in a value of a response time series corresponding to a change in a value of an explanatory time series satisfies a preliminarily defined condition, the explanatory time series classification unit 104 may specify the explanatory time series as being an explanatory time series that is apparently an effect factor for the response time series. The explanatory time series classification unit 104 may calculate, for example, a ratio of a change in a value of a response time series to magnitude of a change in a value of an explanatory time series when the change occurs. Then, when the calculated ratio is larger than a preliminarily determined threshold value, the explanatory time series classification unit 104 may specify the explanatory time series as being an explanatory time series that is apparently an effect factor for a response time series.

The explanatory time series classification unit 104 may specify an explanatory time series that is apparently an effect factor, on the basis of an information amount that can be calculated between a response time series and an explanatory time series, for example, mutual information. Mutual information can be calculated by using, for example, a maximal information coefficient (MIC). For example, the explanatory time series classification unit 104 may calculate mutual information with a response time series for all observed explanatory time series, may classify an explanatory time series mutual information of which is larger than a predetermined threshold value into a first group, and may classify an explanatory time series other than that into a second group.

Alternatively, the explanatory time series classification unit 104 may execute a multivariate analysis on a response variable by using all explanatory variables, and may determine whether or not each of the explanatory variables is apparently an effect factor, on the basis of a coefficient or a p-value of each of the explanatory variables calculated as a result of the multivariate analysis.

Classification of a group may be performed by a combination of classification methods described above.

When a new time series is added to the data storage unit 111, or when there is an unclassified time series, the explanatory time series classification unit 104 may classify the time series.

When determining to which group an explanatory time series belongs, the explanatory time series classification unit 104 associates information (group information) indicating to which group the explanatory time series belongs with the explanatory time series. The explanatory time series classification unit 104 associates group information with a time series as illustrated in FIG. 4, for example. Alternatively, the explanatory time series classification unit 104 may arrange a time series in an area associated with group information, as illustrated in FIG. 5.

The representative time series selection unit 105 selects one of explanatory time series in a first group as being a representative time series.

In the present example embodiment, as an example, the representative time series selection unit 105 selects, as being a representative time series, a time series most strongly influencing a change in a value of a response time series. The representative time series selection unit 105 may select, as being a representative time series, an explanatory time series that is specified by an approach capable of specifying a time series most strongly influencing a change in a value of a response time series. For example, the representative time series selection unit 105 calculates an influence degree of each explanatory time series in a first group on a response time series. An influence degree is a value that represents a degree of influence. An influence degree of an explanatory time series in a first group on a response time series may be understood as being a value that represents a degree of influence that a change in a value of an explanatory time series in a first group gives on a change in a value of a response time series. An influence degree is able to be calculated through, for example, a statistical analysis.

For example, the representative time series selection unit 105 executes a multivariate analysis in which a response time series is set as a response variable and an explanatory time series in a first group is set as an explanatory variable. As a multivariate analysis approach, the representative time series selection unit 105 may use any approach, as long as the approach is a method of calculating an influence degree of an explanatory variable on a change in a value of a response variable. For example, when a response time series is quantitative data, the representative time series selection unit 105 is able to use a multiple regression analysis as a multivariate analysis. When a multiple regression analysis is used, the representative time series selection unit 105 is able to regard a t-value or a reciprocal of a p-value calculated for each explanatory variable, as being an influence degree. When a response time series is qualitative data, the representative time series selection unit 105 is able to use, for example, a logistic regression analysis as a multivariate analysis. When a logistic regression analysis is used, the representative time series selection unit 105 is able to regard a Wald statistic or a reciprocal of a p-value calculated for each explanatory variable, as being an influence degree.

In the description of the present example embodiment, the larger influence an explanatory variable gives on a change in a value of a response variable is, the larger a value of an influence degree of the explanatory variable is.

The representative time series selection unit 105 may select an explanatory time series that has the largest influence on a change in a value of a response time series, as being a representative time series, on the basis of a calculated influence degree. Specifically, the representative time series selection unit 105 may specify an explanatory time series having the largest influence degree calculated by, for example, a method as described above, and may select the specified explanatory time series as being a representative time series.

Note that, when a certain explanatory variable is qualitative data, the representative time series selection unit 105 may perform a multivariate analysis after transforming the explanatory variable into a dummy variable.

Further, the number of a multivariate analysis approach used by the representative time series selection unit 105 may not necessarily be limited to one. The representative time series selection unit 105 may calculate influence degrees individually by using two or more multivariate analysis approaches, and may integrate the two or more calculated influence degrees. In integrating influence degrees, the representative time series selection unit 105 may normalize, for example, in each multivariate analysis approach, calculated influence degrees in such a way that a maximum value becomes 1 and a minimum value becomes 0, and may obtain a sum or a mean of the normalized influence degrees. The representative time series selection unit 105 may weight a multivariate analysis approach. The representative time series selection unit 105 may multiply an influence calculated by using a multivariate analysis approach by a weight set for the multivariate analysis approach, and may integrate the influence degree multiplied by the weight.

Upon selecting a representative time series, the representative time series selection unit 105 records, on the data storage unit 111, information indicating which the selected representative time series is. The representative time series selection unit 105 may transmit the information to the influence degree calculation unit 106.

The influence degree calculation unit 106 calculates an influence degree of each explanatory time series in a second group on a representative time series. Specifically, the influence degree calculation unit 106 reads, from the data storage unit 111, an explanatory time series in a second group and a representative explanatory time series. Then, the influence degree calculation unit 106 executes a multivariate analysis in which an explanatory time series in a second group is set as an explanatory variable and a representative time series is set as a response variable, and calculates an influence degree of each explanatory time series from a result of the multivariate analysis. A method of calculating an influence degree performed by the influence degree calculation unit 106 may be similar to the method already described in the representative time series selection unit 105.

The influence degree calculation unit 106 saves each calculated influence degree in the influence degree storage unit 112. In this case, the influence degree calculation unit 106 may sort an explanatory time series in a second group in descending order of a calculated influence degree (when a plurality of influence degrees are calculated by using a plurality of multivariate analyses, an integrated influence degree), and may store the sorted explanatory time series in the influence degree storage unit 112.

The influence degree storage unit 112 stores an influence degree calculated by the influence degree calculation unit 106.

The analysis unit 107 analyzes a result of calculation performed by the influence degree calculation unit 106. Specifically, the analysis unit 107 specifies, on the basis of a calculated influence degree, an explanatory time series an influence of which on a change in a value of a representative time series is larger than a reference. For example, the analysis unit 107 specifies an explanatory time series an influence degree of which on a calculated representative time series exceeds a threshold value. Since a representative time series is an effect factor which has influence on a response time series, an influence degree on a representative time series can be regarded as one of influence degrees on a response time series. Thus, it can be said that a time series having a high influence degree on a representative time series is a time series having a high influence degree on a response time series.

The threshold value described above may be designated by an analyzer. Alternatively, the threshold value may be determined according to an influence degree of a representative time series on a response time series. For example, an analyzer designates a certain value α as a reference of a threshold value (hereinafter, referred to as a "reference threshold value") for use in determination of possibility of being an effect factor for a representative time series. When a normalized influence degree of a representative time series on a response time series calculated by the representative time series selection unit 105 is β, the analysis unit 107 may set a value obtained by dividing α by β, as a threshold value described above. A time series that is specified through an analysis of the analysis unit 107 on the basis of this threshold value has a high possibility of being a time series that has strong influence on a response time series.

Alternatively, the analysis unit 107 may use a reference threshold value described above, as a threshold value for determination described above. In that case, the analysis unit 107 may correct an influence degree on a representative time series, and may use a corrected value for an analysis. For example, when a normalized influence degree of a representative time series on a response time series is β, the analysis unit 107 may compare a value obtained by dividing an influence degree of each explanatory time series by β, with a reference threshold value α.

The analysis unit 107 records, in the influence degree storage unit 112, information indicating that there is a possibility that a specified explanatory time series has strong influence on a response time series.

Further, the analysis unit 107 may further analyze whether or not a specified explanatory time series is an effect factor for a response time series. For example, the analysis unit 107 performs a multivariate analysis on a response time series, in which an explanatory time series in a first group excluding a representative time series and the specified explanatory time series are set as explanatory variables. When a contribution rate of the specified explanatory time series with respect to a response time series calculated by this multivariate analysis is significant (for example, exceeds a predetermined threshold value), it can be said that the specified explanatory time series is an effect factor for the response time series. The analysis unit 107 may record a thus-analyzed result on the influence degree storage unit 112.

An output device 30 outputs information stored in the influence degree storage unit 112 towards an analyzer or the like. The output device 30 may have a display unit or the like. The analyzer or the like is able to check a result of analysis performed by the factor analysis device 10, by using the output information.

Note that, the factor analysis device 10 and the output device 30 are described as separate devices in the present example embodiment, but the factor analysis device 10 may include the output device 30 as a display unit.

<Operation>

Next, operation of the factor analysis device 10 according to the present example embodiment is described with showing an example of specific data.

(Accumulation of Data)

Figure 6:
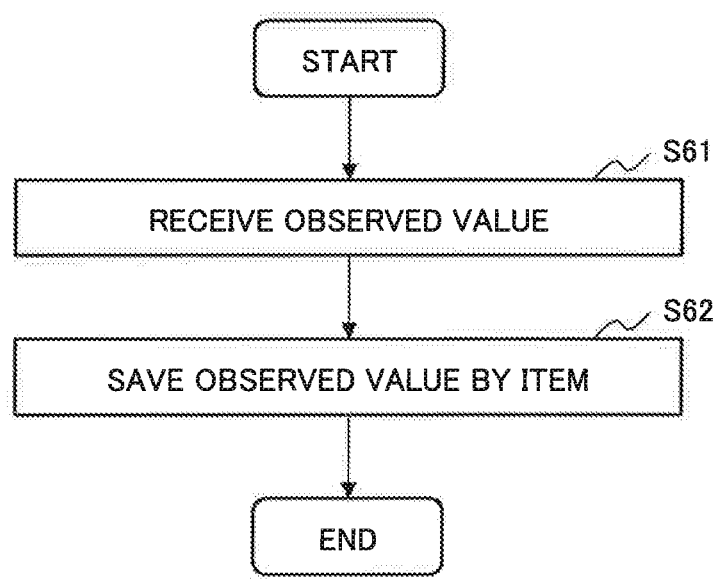
FIG. 6 is a flowchart illustrating a flow of processing of data accumulation performed by the factor analysis device according to the first example embodiment.

FIG. 6 is a flowchart illustrating a flow of processing of data accumulation performed by the factor analysis device 10. First, the reception unit 101 of the factor analysis device 10 receives an observed value from the data acquisition unit 20 (step S61). In a specific example described below, there exist fifty-six types of items. Among the items, there is one item that is a quality index. It is assumed that a value indicated by this item is either one of two values of "normal"

or "abnormal". In other words, an observed value concerning this item is qualitative data. Other fifty-five items are items relating to manufacturing conditions. These fifty-five items may be quantitative data, or may be qualitative data.

Next, the data classification unit 102 saves, in the data storage unit 111, the received observed value item by item as a time series (step S62). It is assumed that fifty-six time series are stored in the data storage unit 111 in this way.

(Analysis)

Figure 7:
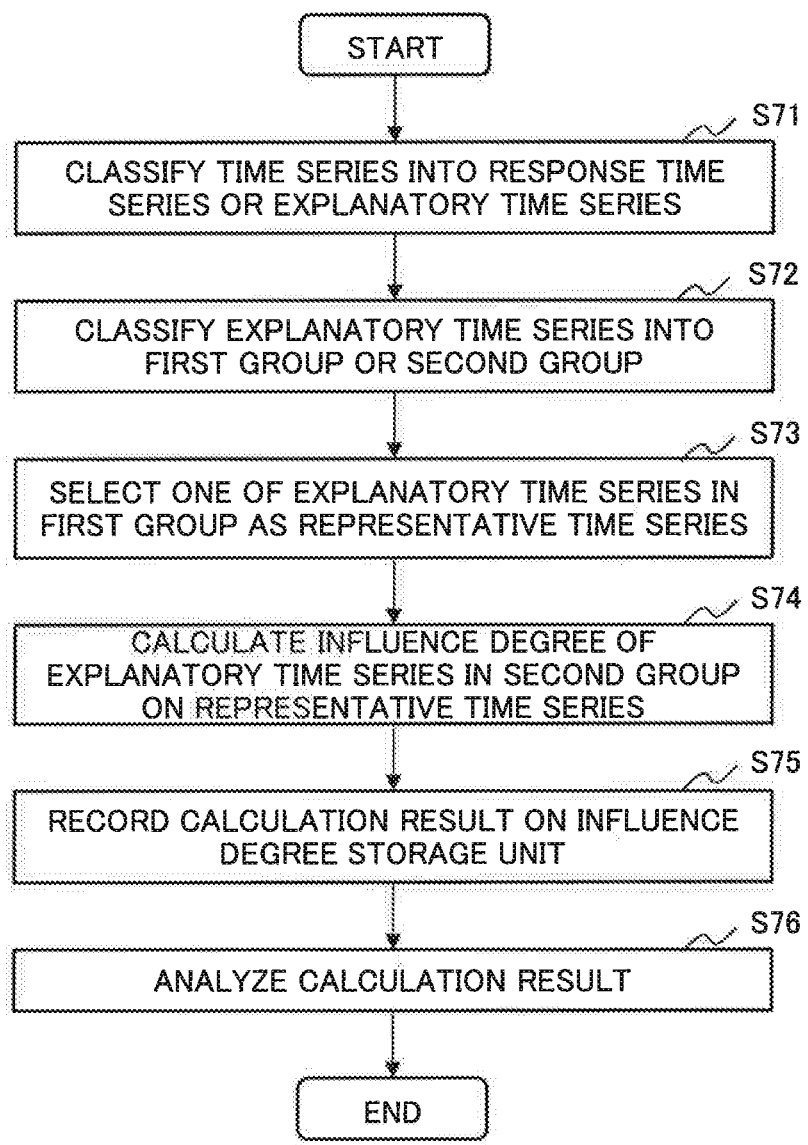
FIG. 7 is a flowchart illustrating a flow of processing of a factor analysis performed by the factor analysis device according to the first example embodiment.

Next, processing of a factor analysis performed by the factor analysis device 10 is described. FIG. 7 is a flowchart illustrating a flow of processing of a factor analysis performed by the factor analysis device 10.

Note that, processing of step S71 and thereafter may be started after one response time series to be a target of an analysis and a plurality of explanatory time series are generated as pieces of data sufficient in number for analysis. The processing may be started by an instruction of a not-illustrated analyzer. When the factor analysis device 10 determines that sufficient pieces of data are accumulated (for example, when the number of observed values of all time series reaches a threshold value), processing of step S71 and thereafter may be started.

First, the time series classification unit 103 classifies a time series into a response time series or an explanatory time series (step S71). However, classification of a time series may not necessarily be performed after start of the flow of operation illustrated in FIG. 7. The time series classification unit 103 may record a class of an obtained time series (or an observed value) on the data storage unit 111 at a point in time when the time series (or the observed value) is recorded on the data storage unit 111.

Through the processing of step S71 described above, a state in which one response time series and fifty-five explanatory time series are discriminated is made up in the data storage unit 111.

Next, the explanatory time series classification unit 104 classifies each explanatory time series which is a target of a factor analysis into a first group or a second group (step S72).

When classifying an explanatory time series into either one of the groups, the explanatory time series classification unit 104 records, in the data storage unit 111, information (group information) indicating a group at a classification destination of the explanatory time series.

Note that, classification of an explanatory time series may not necessarily be performed after start of the flow of operation illustrated in FIG. 7. For example, when group information or a classification criterion for an item is known, the explanatory time series classification unit 104 may notify the data acquisition unit 20 of the known information in advance. In that case, the data acquisition unit 20 can transmit an observed value to the data classification unit 102 by associating the observed value with group information. The explanatory time series classification unit 104 may notify the data classification unit 102 of the known information in advance. In that case, the data classification unit 102 is able to record an observed value on the data storage unit 111 by including group information in the observed value.

Further, the explanatory time series classification unit 104 may classify an explanatory time series before class information for all time series is determined. For example, when the time series classification unit 103 classifies a time series into an explanatory time series, the explanatory time series classification unit 104 may classify, if possible, the explanatory time series at the point in time.

It is assumed that, for example, five explanatory time series t1, t2, t3, t4, and t5 are classified into a first group and other explanatory time series 1 to 50 are classified into a second group through the processing of step S72 described above. In other words, the explanatory time series t1, t2, t3, t4, and t5 are explanatory time series that are apparently effect factors for a value of a response variable, and the explanatory time series 1 to 50 are explanatory time series that are not apparently effect factors for a value of a response variable.

When classification of a group of an explanatory time series is completed, next, the representative time series selection unit 105 selects, as a representative time series, one of the explanatory time series in the first group (step S73).

In the present example embodiment, a representative time series is an explanatory time series that most strongly influences a change in a value of a response time series. Thus, the representative time series selection unit 105 performs a regression analysis for a response time series by setting the explanatory time series t1, t2, t3, t4, and t5 as explanatory variables. Since a response time series is qualitative data, the representative time series selection unit 105 may perform an L1 regularized logistic regression analysis, for example. The representative time series selection unit 105 selects, as a representative time series, an explanatory time series having a highest value of a coefficient in a regression equation obtained by this analysis.

Next, the influence degree calculation unit 106 calculates an influence degree of an explanatory time series in the second group on a change in a value of the representative time series selected in step S73 (step S74). Then, the influence degree calculation unit 106 saves the calculated influence degree of each explanatory time series in the influence degree storage unit 112 (step S75).

In step S74, the influence degree calculation unit 106 may calculate influence degrees individually by using two or more multivariate analysis approaches. Then, the influence degree calculation unit 106 may integrate the two or more calculated influence degrees. In that case, in step S75, the influence degree calculation unit 106 saves the integrated influence degree in the influence degree storage unit 112 as an influence degree of an explanatory time series.

FIG. 8 is a table illustrating an example of an influence degree stored in the influence degree storage unit 112 through step S75. In the example in FIG. 8, "Rank" represents hierarchy of an influence degree. "Time series number" represents a number attached to a time series and identifying the time series. "Influence degree" represents an influence degree of a time series specified by "Time series number".

Then, the analysis unit 107 analyzes a result of calculation of an influence degree performed by the influence degree calculation unit (step S76). Then, the analysis unit 107 records an analysis result in the influence degree storage unit 112.

Upon completion of analysis, the analysis result is output by the output device 30 to an analyzer, for example.

FIG. 9 is an example of an analysis result output by the output device 30. In the example in FIG. 9, "Rank", "Time series number", "Shape", "Influence degree" and "Suggested improvement" are output. "Rank" represents hierarchy of magnitude of an influence degree. "Time series number" represents a number attached to a time series and identifying the time series. "Shape" describes a shape of a graph of a time series specified by "Time series number". "Influence degree" describes an influence degree of the time series. As indicated in a column of "Suggested improvement" in the table in FIG. 7, the analysis unit 107 may include, in an analysis result, a suggestion indicating how a value of an item of the time series is to be changed in order to change (for example, increase) a value of a representative time series. A content described in suggested improvement may be determined on the basis of a shape of a time series or a change in a value of a representative time series attendant on a change in a value of an explanatory time series. As described, the analysis unit 107 may add information to the influence degree storage unit 112 in such a way that various kinds of information for aiding analyzer's understanding of an analysis result are output.

Output of an analysis result enables an analyzer or the like at an output destination to grasp hierarchy of an influence degree on a representative time series (i.e., one of explanatory time series having influence on a change in a value of a response time series), regarding an explanatory variable a degree of contribution of which to a change in a value of a response time series is not apparent.

In the example illustrated in FIG. 9, it can be seen that an explanatory time series wherein "Time series number" is "8" has the largest influence degree on a representative time series, and that an explanatory time series wherein "Time series number" is "22" has a second largest influence degree on the representative time series. Further, by referring to "Shape", "Influence degree" and "Suggested improvement", an analyzer is able to consider a possibility that an explanatory time series of each of the time series numbers is an effect factor for a response time series. Further, the analyzer is able to understand that a value of a response time series can possibly be changed by increasing amplitude of the explanatory time series wherein time series number is "8". In this way, the analyzer is able to more specifically understand measures for improving quality of a product.

<Advantageous Effect>

An advantageous effect of the first example embodiment is described.

The factor analysis device 10 according to the present example embodiment is able to specify an item having a high possibility of being an effect factor, regarding an explanatory time series that has not been apparently an effect factor. The reason is as follows. A multivariate analysis on one item that is apparently an effect factor is executed by setting an item that is not apparently an effect factor as an explanatory variable. Thereby, an item having a high influence degree on the one item that is apparently an effect factor is calculated. In particular, an item that is strongly associated with an effect factor having strong influence on a response variable is less likely to be determined as being an effect factor by a multivariate analysis in which all items are explanatory variables, but can be specified by the factor analysis device 10 according to the present example embodiment.

Accordingly, an administrator of a product is able to more accurately grasp an effect factor concerning quality of the product.

The factor analysis device 10 may re-classify an item in a second group specified as being an effect factor into a first group, and may execute steps S73 to S76 again. By doing so, the factor analysis device 10 has a possibility of further finding a hidden effect factor.

The factor analysis device 10 may present, to an output destination via the output device 30, a regression equation formed by an explanatory time series in a first group with respect to a response time series and a regression equation of a second group with respect to a representative time series. Accordingly, an analyzer at the output destination is able to more specifically guess how much a change in an observed value pertaining to a specified item contributes to a value of a quality standard.

The reason is as follows. A value of a response variable can be described by using a function of major effect factors, and one of the major effect factors can be described by using a function of a specified item. Thereby, a response time series and a time series of the specified item can be quantitatively associated with each other. (For example, it is assumed that a response time series is denoted by Y, a set of explanatory time series is denoted by X, a set of explanatory time series in a first group is denoted by $T \subset X$, a set of explanatory time series in a second group is denoted by $F=X \backslash T$, and a representative time series is denoted by $t \in T$. "\" is a symbol representing a set difference. At this time, when $y=f(T)$ and $t=g(F)$ can hold as a functional input-output relation, then $y=f(T)=f(T \backslash t, g(F))$, and thus, $y=h(T \backslash t, F)$ can be described by using a certain function h.)

In this way, the factor analysis device 10 according to the present example embodiment enables an administrator of a product to obtain more useful knowledge relating to an influence degree of each piece of data.

Note that, in the first example embodiment, a criterion for classifying a first group and a second group is not limited to the example indicated above. A modification example of a criterion for classification and an effect thereof are described below, respectively.

Modification Example 1

A criterion for classification of an explanatory time series performed by the explanatory time series classification unit 104 may not necessarily be whether or not an explanatory time series is specified as being apparently an effect factor. For example, the explanatory time series classification unit 104 may classify an explanatory time series in such a way that magnitude of a relationship between an explanatory time series classified into a first group and a response time series becomes larger than magnitude of a relationship between an explanatory time series classified into a second group and the response time series. In this case, for example, the explanatory time series classification unit 104 classifies an explanatory time series on the basis of magnitude of a value representing magnitude of a relationship between an explanatory time series and a response time series. A value representing magnitude of a relationship between an explanatory time series that is apparently an effect factor and a response time series is expected to be larger than a value representing magnitude of a relationship between an explanatory time series that is not apparently an effect factor and the response time series. Thus, an explanatory time series that is apparently an effect factor is expected to be classified into the first group, not into the second group.

Further, a criterion for classification described above may be combined with a criterion that is whether or not an explanatory time series is specified as being apparently an effect factor. For example, the explanatory time series classification unit 104 may classify an explanatory time series in such a way that magnitude of a relationship between an explanatory time series classified into a first group and a response time series becomes larger than magnitude of a relationship between an explanatory time series classified into a second group and the response time series, and thereafter, may re-classify an explanatory time series in the second group that can be specified as being apparently an effect factor into the first group.

Modification Example 2

When an item in a second group having a high influence degree on a value of an item in a first group is revealed, the value of the item in the first group can be indirectly controlled by controlling a value of the item in the second group. Then, when the item in the first group is an effect factor for a response item, a value of the response item can possibly be indirectly controlled by controlling the value of the item in the second group having a high influence degree on the value of the item in the first group, and thereby indirectly controlling the value of the item in the first group.

The explanatory time series classification unit 104 may be designed to classify a time series of an item a value of which cannot be directly controlled into a first group. For example, the factor analysis device 10 may be designed in such a way that an analyzer or the like can set, for each item, information representing whether or not a value of an item can be directly controlled, and in such a way that the explanatory time series classification unit 104 can recognize the information. On the basis of the information, the explanatory time series classification unit 104 classifies a time series of an item a value of which cannot be directly controlled into a first group.

According to a configuration as described above, a second group includes only an item a value of which can be directly controlled. When an analysis is performed in such a situation by the factor analysis device 10 according to the first example embodiment, an analysis result of analyzing an explanatory time series of an item in a first group can be obtained in which only an explanatory time series of a directly controllable item is set as an explanatory variable. When this analysis reveals an item in the second group with large influence degree on a value of an item in the first group that is an effect factor and a value of which cannot be directly controlled, a value of a response item can possibly be indirectly controlled by controlling a value of the item in the second group.

The influence degree calculation unit 106 may calculate, for all explanatory time series in a first group, an influence degree of an explanatory time series in a second group. On the basis of a result thereof, the analysis unit 107 may specify an explanatory time series in the second group that can possibly indirectly control a value of a response time series by controlling any one of values of the explanatory time series in the first group. Accordingly, an analyzer is able to know an item that is directly controllable and that can possibly indirectly control a quality standard. Further, for example, when an analyzer wants to change a value of an item that is an effect factor but is uncontrollable, the analyzer is able to specify an item that is able to be controlled to indirectly control the value.

Modification Example 3

The explanatory time series classification unit 104 may generate a cluster of items having a strong association degree with each other, may classify a time series of a variable having the strongest influence on a response variable into a first group from among each cluster, and may classify other time series into a second group. According to such classification, it becomes possible to find an item that has not been determined as being an effect factor because of existence of a strong effect factor in an analysis in which all items are set as explanatory variables.

<Other Matters That Can Be Changed>

A representative time series may be designated by an analyzer. For example, in the first example embodiment, an analyzer transmits, to the factor analysis device 10, information designating one of items that cannot be directly controlled, among explanatory time series in a first group that are known for being effect factors. The representative time series selection unit 105 of the factor analysis device 10 selects the designated item as a representative time series. The influence degree calculation unit 106 calculates an influence degree of an explanatory time series in a second group on the representative time series. Accordingly, the analyzer is able to specify an item having a high influence degree on an item that is an effect factor but cannot be directly controlled, among items that are not known for being effect factors.

Further, when a multivariate analysis on an explanatory time series in a first group is performed by using a regression analysis, the influence degree calculation unit 106 may calculate a multiple contribution rate that is an index indicating how well a generated regression model fits. When the influence degree calculation unit 106 reveals multiple contribution rates of a regression model formed by explanatory time series in a second group for all explanatory time series in a first group, an explanatory time series in the first group having a low association degree with the explanatory time series in the second group is revealed. At this time, the analysis unit 107 may store an item classified into the first group in an influence degree storage means, in such a way that an item having a calculated multiple contribution rate of equal to or more than a predetermined value and an item having a multiple contribution rate of less than the predetermined value are distinctively output. Accordingly, an analyzer at an output destination is able to know an explanatory time series that can explain a value by using only the explanatory time series in the second group and an explanatory time series that cannot explain a value by using only the explanatory time series in the second group. On the basis of this result, the analyzer is able to execute a multivariate analysis on a response time series by setting explanatory time series in the first group having a multiple contribution rate of equal to or less than the predetermined value and explanatory time series in the second group as explanatory variables. When this analysis is performed according to the first example embodiment, the analyzer can easily find an effect factor from an explanatory time series in the second group, since an effect factor having a high association degree with the explanatory time series in the second group is not included in explanatory variables. Further, when this analysis is performed according to the modification example 2, the analyzer is able to generate a regression equation in which an accumulated contribution rate of an item a value of which is able to be directly controlled is larger than that in a multivariate analysis in which all explanatory time series are explanatory variables.

The analysis approach described in the present example embodiment is one example, and another analysis approach may be used as long as being a possible approach in order to carry out the present invention. For example, the influence degree calculation unit 106 may use a random forest as a multivariate analysis approach. Further, when a response time series is quantitative data, the representative time series selection unit 105 may select a representative time series by using a multiple regression analysis approach.

Further, in the present example embodiment, an analysis target is a manufacturing process in which a plurality of sensors for observing manufacturing conditions such as temperature and a gas flow rate are used. However, the present factor analysis device is applicable to various scenes in which multivariable data are used in order to specify a factor for change in a value of a certain variable. For example, the present factor analysis device may be used in a test of a product, or in management of an IT system or a plant system. For example, the present factor analysis device is able to analyze, using a quality standard of "whether or not a product is broken" in a water resistant test of the product, an effect factor concerning the quality standard on the basis of observation data of a successive change in conditions such as temperature of water, water immersion time, vibration applied to the product, or a direction of the product. For example, in an IT system, the present factor analysis device may be used in a scene of specifying a factor concerning a power consumption amount, computation time, or the like that is a performance index, by using a time series of a CPU use rate, a memory use rate, disk access frequency, a disk use amount, or the like.

The factor analysis device 10 may re-select a representative time series. For example, after step S76, the factor analysis device 10 may select a representative time series different from a selected representative time series, and may execute processing of steps S74 to S76 again. Accordingly, there is a possibility that the analysis unit 107 would find an effect factor that has not been found in an analysis based on a first selected representative time series.

In the present example embodiment, an analysis target is one response time series. However, an analysis target may be a plurality of response time series. When there are a plurality of response time series, the factor analysis device 10 is able to specify an explanatory time series influencing a change in a value of each of the response time series by performing processing of steps S72 to S76 individually on each of the response time series.

In the present example embodiment, a time series that is data in which time and an observed value are associated with each other is used for an analysis. However, a time series may not necessary be used for an analysis. For example, when a factor giving influence on quality of a product is analyzed one by one for products manufactured under different conditions, pieces of data of an item may be associated with each other by a product number. In other words, the factor analysis device 10 is able to perform an analysis similar to the analysis indicated in the above-described example embodiment, by using data of a product number and an observed value.

Second Example Embodiment

Figure 10:
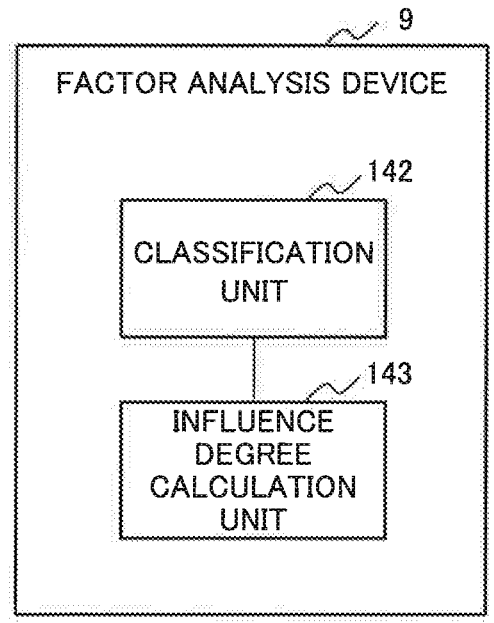
FIG. 10 is a block diagram illustrating a configuration of a factor analysis device according to a second example embodiment of the present invention.

A factor analysis device including primary units according to the above-described example embodiment is described as a second example embodiment of the present invention. FIG. 10 is a block diagram illustrating a configuration of a factor analysis device 9 according to the second example embodiment of the present invention. As illustrated in FIG. 10, the factor analysis device 9 includes a classification unit 92 and an influence degree calculation unit 93. A data storage unit 91 may be communicably connected with the factor analysis device 9 outside the factor device.

The classification unit 92 classifies a type of data into a first group or a second group, in accordance with a predetermined criterion.

The influence degree calculation unit 93 calculates, as an influence degree on response data, an influence degree of data of a type classified into a second group, on data of a type in a first group. Response data are data a value of which changes and the change in the value may possibly be influenced by a change in a value of data of a type in a first group and a second group.

For example, the influence degree calculation unit 93 performs a multivariate analysis in which data of a type in a second group are set as explanatory variables, with setting, as a target, data of one type that is a factor having influence on a value of response data among data of a type classified into a first group. Then, the influence degree calculation unit 93 calculates each influence degree of each piece of the data of the type in the second group on the target. The calculated influence degree is regarded as being an influence degree on the response data.

The influence degree calculation unit 93 may specify a type of data a calculated influence degree of which exceeds a predetermined threshold value, as being a candidate of a factor having influence on a value of response data.

Figure 11:
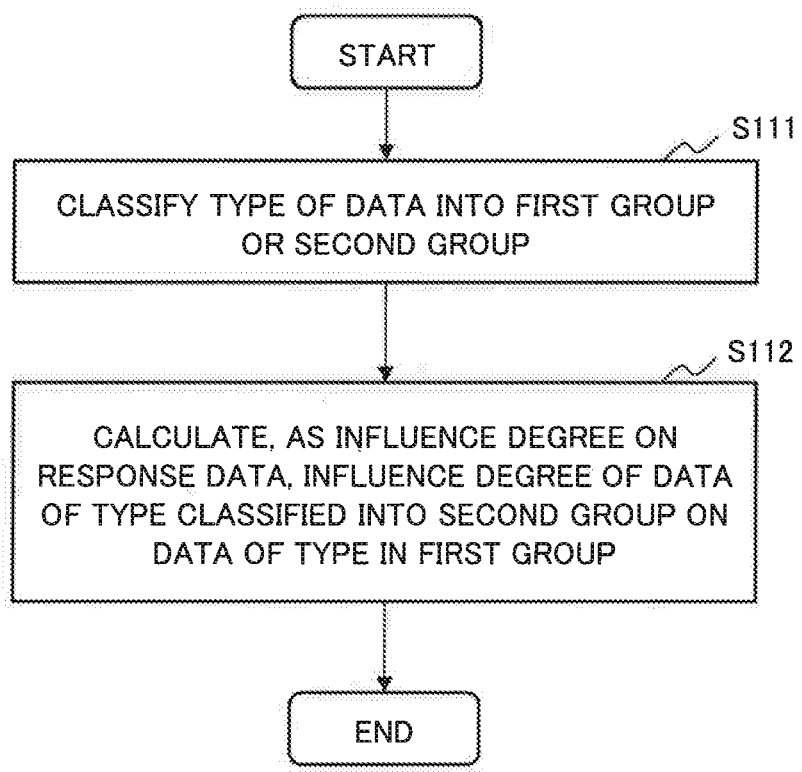
FIG. 11 is a flowchart illustrating a flow of processing of a factor analysis performed by the factor analysis device according to the second example embodiment.

A flow of operation of the factor analysis device 9 is as illustrated in FIG. 11. First, the classification unit 92 classifies a type of data into a first group or a second group (step S111). Next, the influence degree calculation unit 93 calculates, as an influence degree on response data, an influence degree of data of a type classified into the second group, on data of a type in the first group (step S112).

The present factor analysis device enables obtaining more useful knowledge relating to an influence degree of each piece of data. The reason is as follows. A type of data that is likely to be hidden by a type of data having a high influence degree on response data is easily found by calculating an influence degree of data in a group excluding a particular type, on data of the particular type.

Figure 12:
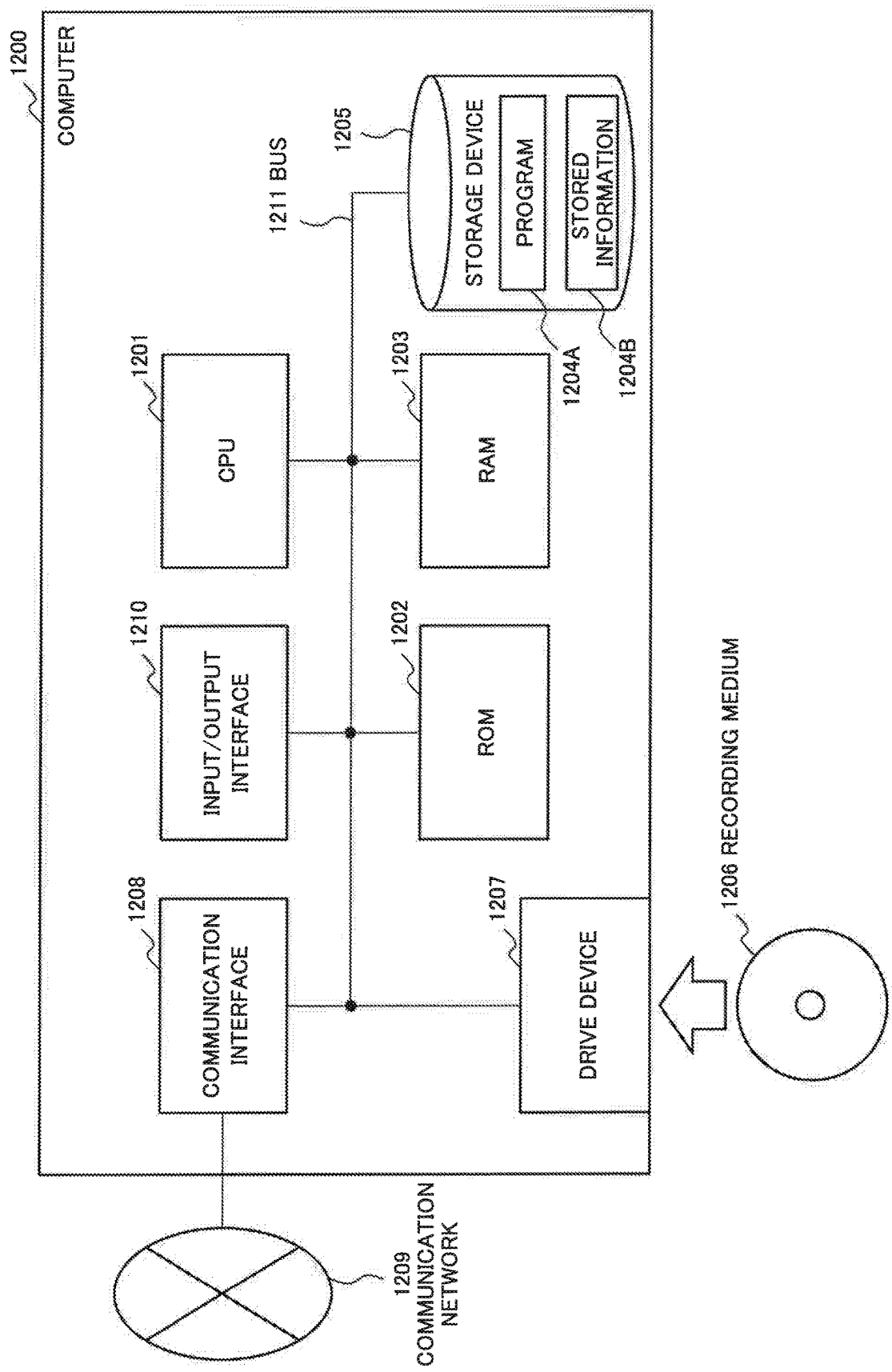
FIG. 12 is a block diagram illustrating an example of hardware constituting the respective components according to each example embodiment of the present invention.

In each of the example embodiments of the present invention described above, components of each device indicate blocks on a function basis. A part or all of the components of each device are implemented by a possible combination of, for example, a computer 1200 as illustrated in FIG. 12 and a program. The computer 1200 includes, as one example, configurations as follows.

a CPU 1201
a read only memory (ROM) 1202
a RAM 1203
a program 1204A and stored information 1204B loaded on the RAM 1203
a storage device 1205 storing the program 1204A and the stored information 1204B
a drive device 1207 reading and writing from and to a recording medium 1206
a communication interface 1208 connected with a communication network 1209
an input/output interface 1210 inputting and outputting data
a bus 1211 connecting the components Components of each device according to each of the example embodiments are implemented by loading, on the RAM 1203, and executing, by the CPU 1201, the program 1204A implementing functions thereof. The program 1204A implementing the functions of the components of each device is stored in, for example, the storage device 1205 or in the ROM 1202 in advance, and is read by the CPU 1201 as needed. The program 1204A may be supplied to the CPU 1201 via the communication network 1209, or may be stored in the recording medium 1206 in advance and the drive device 1207 may read and supply the program to the CPU 1201.

There are various modification examples of a method of implementing each device. For example, each device may be implemented by a possible combination of the computer 1200 and a program respectively different for each component. Further, a plurality of components included in each device may be implemented by a possible combination of one computer 1200 and a program.

Further, a part or all of the components of each device are implemented by another general-purpose or dedicated circuit, a computer and the like, or by a combination thereof. These may be configured by a single chip, or may be configured by a plurality of chips connected via a bus.

Figure 13:
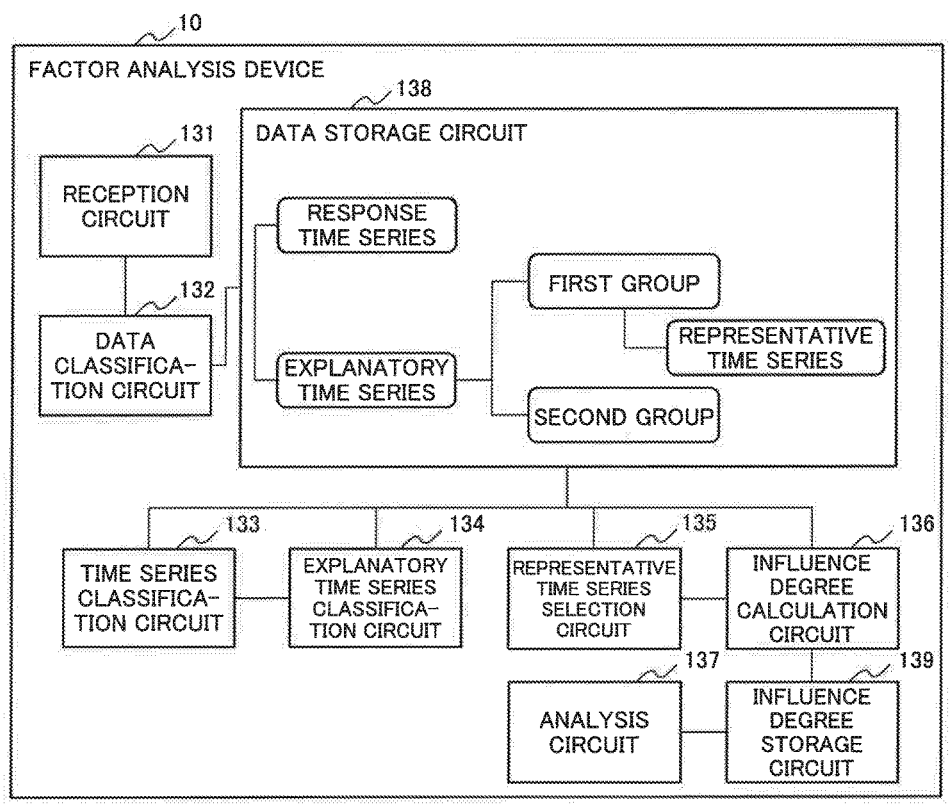
FIG. 13 is a block diagram in a case in which components according to the first example embodiment are achieved by circuits.
Figure 14:
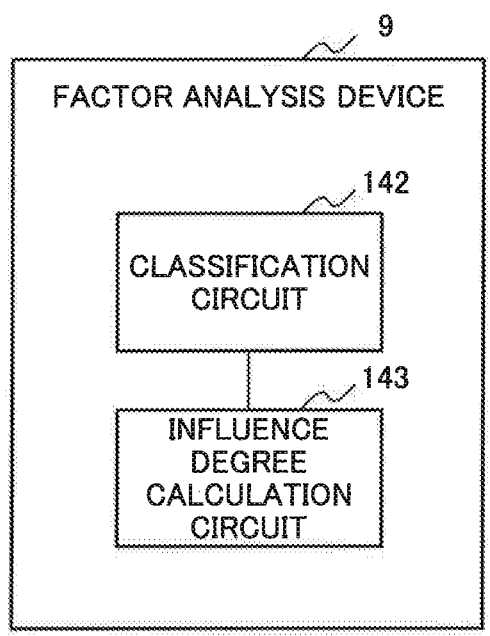
FIG. 14 is a block diagram in a case in which components according to the second example embodiment are achieved by circuits.

A part or all of the functions of the components according to each of the example embodiments may be implemented by a combination of the above-described circuit and the like and a program, as illustrated in FIGS. 13 and 14.

FIG. 13 is a block diagram representing a case in which each component of the factor analysis device 10 according to the first example embodiment of the present invention is achieved by a circuit. In FIG. 13, a reception circuit 131 functions as the reception unit 101. A data classification circuit 132 functions as the data classification unit 102. A time series classification circuit 133 functions as the time series classification unit 103. An explanatory time series classification circuit 134 functions as the explanatory time series classification unit 104. A representative time series selection circuit 135 functions as the representative time series selection unit 105. An influence degree calculation circuit 136 functions as the influence degree calculation unit 106. An analysis circuit 137 functions as the analysis unit 107. A data storage circuit 138 functions as the data storage unit 111. An influence degree storage circuit 139 functions as the influence degree storage unit 112.

FIG. 14 is a block diagram representing a case in which each component of the factor analysis device 9 according to the second example embodiment of the present invention is constituted by a circuit. In FIG. 14, a classification circuit 142 functions as the classification unit 92. An influence degree calculation circuit 143 functions as the influence degree calculation unit 93.

When a part or all of the components of each device are implemented by a plurality of computers, circuits, and the like, the plurality of computers, the circuits, and the like may be centralizedly arranged, or may be distributedly arranged. For example, a computer, a circuit, and the like may be implemented in a form of a client and server system, a cloud computing system, or the like, in which the computer, the circuit, and the like are respectively connected via a communication network.

The present invention is not limited to the above-described embodiments. Those of ordinary skill in the art may make variously changes in form and details of the above-described embodiments within scope of the present invention.

The present application claims the benefits of priority based on Japanese Patent Application No. 2016-057937, filed on Mar. 23, 2016, the entire disclosure of which is incorporated herein by reference.

All or part of the example embodiments described above may be described as in the following supplementary notes, but the present invention is not limited thereto.

(Supplementary Note 1)
A factor analysis device comprising:
classification means for classifying a type of data into a first group or a second group; and
influence degree calculation means for calculating, as an influence degree on response data, an influence degree of data of the type classified into the second group, on data of the type in the first group.

(Supplementary Note 2)
The factor analysis device according to Supplementary Note 1, wherein
the classification means classifies the type specified as being the type that apparently influences the response data, into the first group.

(Supplementary Note 3)
The factor analysis device according to Supplementary Note 1 or 2, wherein
the classification means classifies the type of data in such a way that influence of the data of the type classified into the first group on the response data is larger than influence of the data of the type classified into the second group on the response data.

(Supplementary Note 4)
The factor analysis device according to any one of Supplementary Notes 1 to 3, further comprising
analysis means for specifying, as an effect factor having influence on the response data, data of the type in the second group an influence of which on the data of the type classified into the first group is larger than a reference, based on the influence degree calculated as the influence degree on the response data.

(Supplementary Note 5)
The factor analysis device according to any one of Supplementary Notes 1 to 4, wherein
the type of data includes a type of data a change of which in a value is directly controllable and a type of data a change of which is not directly controllable,
the classification means classifies the type of data a change of which in a value is directly controllable into the first group, and
the influence degree calculation means calculates an influence degree of data of the type classified into the second group, on data of a type in the first group.

(Supplementary Note 6)
A factor analysis method comprising:
classifying a type of data into a first group or a second group; and
calculating, as an influence degree on response data, an influence degree of data of the type classified into the second group, on data of the type in the first group.

(Supplementary Note 7)
The factor analysis method according to Supplementary Note 6, comprising
classifying the type specified as being the type that apparently influences the response data, into the first group.

(Supplementary Note 8)
The factor analysis method according to Supplementary Note 6 or 7, comprising
classifying the type of data in such a way that influence of the data of the type classified into the first group on the response data is larger than influence of the data of the type classified into the second group on the response data.

(Supplementary Note 9)
The factor analysis method according to any one of Supplementary Notes 6 to 8, further comprising
specifying, as an effect factor having influence on the response data, data of the type in the second group an influence of which on the data of the type classified into the first group is larger than a reference, based on the influence degree calculated as the influence degree on the response data.

(Supplementary Note 10)

The factor analysis method according to any one of Supplementary Notes 6 to 9, wherein the type of data includes a type of data a change of which in a value is directly controllable and a type of data a change of which is not directly controllable, and the factor analysis method further comprises:

classifying the type of data a change of which in a value is directly controllable into the first group; and calculating an influence degree of data of the type classified into the second group, on data of a type in the first group.

(Supplementary Note 11)

A computer-readable storage medium storing a program that causes a computer to execute:

classification processing for classifying a type of data into a first group or a second group; and influence degree calculation processing for calculating, as an influence degree on response data, an influence degree of data of the type classified into the second group, on data of the type in the first group.

(Supplementary Note 12)

The storage medium according to Supplementary Note 11, wherein the classification processing includes processing for classifying the type specified as being the type that apparently influences the response data, into the first group.

(Supplementary Note 13)

The storage medium according to Supplementary Note 11 or 12, wherein the classification processing includes processing for classifying the type of data in such a way that influence of the data of the type classified into the first group on the response data is larger than influence of the data of the type classified into the second group on the response data.

(Supplementary Note 14)

The storage medium according to any one of Supplementary Notes 11 to 13, wherein the program further causes the computer to execute analysis processing for specifying, as an effect factor having influence on the response data, data of the type in the second group an influence of which on the data of the type classified into the first group is larger than a reference, based on the influence degree calculated as the influence degree on the response data.

(Supplementary Note 15)

The storage medium according to any one of Supplementary Notes 11 to 14, wherein the type of data includes a type of data a change of which in a value is directly controllable and a type of data a change of which is not directly controllable, the classification processing includes processing for classifying the type of data a change of which in a value is directly controllable into the first group, and the influence degree calculation processing includes processing for calculating an influence degree of data of the type classified into the second group, on data of a type in the first group.

REFERENCE SIGNS LIST 9 factor analysis device
10 factor analysis device
20 data acquisition unit
30 output device
92 classification unit
93 influence degree calculation unit
101 reception unit
102 data classification unit
103 time series classification unit
104 explanatory time series classification unit
105 representative time series selection unit
106 influence degree calculation unit
107 analysis unit
111 data storage unit
112 influence degree storage unit
131 reception circuit
132 data classification circuit
133 time series classification circuit
134 explanatory time series classification circuit
135 representative time series selection circuit
136 influence degree calculation circuit
137 analysis circuit
138 data storage circuit
139 influence degree storage circuit
142 classification circuit
143 influence degree calculation circuit
1200 computer
1201 CPU
1202 ROM
1203 RAM
1204A program
1204B stored information
1205 storage device
1206 recording medium
1207 drive device
1208 communication interface
1209 communication network
1210 input/output interface
1211 bus

The invention claimed is:

1. A factor analysis device applied for quality management in a manufacturing process of a certain product, the factor analysis device comprising:

a memory that stores instructions; and at least one processing device coupled to the memory, the at least one processing device being configured to execute the instructions to:

classify a plurality of types of explanatory time series into a first group or a second group;

select, as a representative time series, one of the explanatory time series most strongly influencing a change in a value of a response time series from the first group; and calculate an influence degree of another of the explanatory time series of a type, of the types, classified into the second group, on the representative time series of a type, of the types, classified into the first group by executing a multivariate analysis in which the other of the explanatory time series in the second group is set as an explanatory variable and the representative time series is set as a response variable, wherein the explanatory time series comprise a type of time series pertaining to a manufacturing condition, and the response time series comprises a type of time series pertaining to a quality index of the certain product.

2. The factor analysis device according to claim 1, wherein the at least one processing device is configured to execute the instructions to:

classify the type, of the representative time series from the first group, as influencing the response time series and into the first group.

3. The factor analysis device according to claim 1, wherein the at least one processing device is configured to execute the instructions to:
classify the types of the explanatory time series in such a way that an influence of the one of the explanatory time series of the type classified into the first group on the response time series is larger than an influence of the other of the explanatory time series of the type classified into the second group on the response time series by mutual information that can be calculated by using a maximal information coefficient (MIC) or by executing a multivariate analysis.

4. The factor analysis device according to claim 1 wherein the at least one processing device is further configured to execute the instructions to:
specify, as an effect factor having an influence on the response time series, the other of the explanatory time series of the type classified into the second group as comprising the influence degree which, on the one of the explanatory time series of the type classified into the first group, is larger than a reference, based on another influence degree on the response time series.

5. The factor analysis device according to claim 1, wherein
the types of the explanatory time series include a type of the explanatory time series of which a change in a value is directly controllable and a type of the explanatory time series of which a change is not directly controllable but is indirectly controllable, and
the at least one processing device is further configured to execute the instructions to:
classify the type of the one of the explanatory time series into the first group as the type of the explanatory time series of which the change in the value is directly controllable, and
calculate the influence degree of the other of the explanatory time series of the type classified into the second group as on the one of the explanatory time series of the type classified into the first group.

6. A factor analysis method applied for quality management in a manufacturing process of a certain product, the factor analysis method comprising:
classifying a plurality of types of explanatory time series into a first group or a second group;
selecting, as a representative time series, one of the explanatory time series most strongly influencing a change in a value of a response time series from the first group; and
calculating an influence degree of another of the explanatory time series of a type, of the types, classified into the second group, on the representative time series of a type, of the types, classified into the first group by executing a multivariate analysis in which the other of the explanatory time series in the second group is set as an explanatory variable and the representative time series is set as a response variable,
wherein the explanatory time series comprises a type of time series pertaining to a manufacturing condition, and
the response time series comprises a type of time series pertaining to a quality index of the certain product.

7. The factor analysis method according to claim 6, comprising:
classifying the type, of the representative time series from the first group, as influencing the response time series and into the first group.

8. The factor analysis method according to claim 6, comprising:
classifying the types of the explanatory time series in such a way that an influence of the one of the explanatory time series of the type classified into the first group on the response time series is larger than an influence of the other of the explanatory time series of the type classified into the second group on the response time series by mutual information that can be calculated by using a maximal information coefficient (MIC) or by executing a multivariate analysis.

9. The factor analysis method according to claim 6, further comprising:
specifying, as an effect factor having an influence on the response time series, the other of the explanatory time series of the type classified into the second group as comprising the influence degree of which, on the one of the explanatory time series of the type classified into the first group, is larger than a reference, based on another influence degree on the response time series.

10. The factor analysis method according to claim 6, wherein
the types of the explanatory time series include a type of the explanatory time series of which a change in a value is directly controllable and a type of the explanatory time series of which a change is not directly controllable but is indirectly controllable, and
the factor analysis method further comprises:
classifying the type of the one of the explanatory time series into the first group as the type of the explanatory time series of which the change in the value is directly controllable; and
calculating the influence degree of the other of the explanatory time series of the type classified into the second group on the one of the explanatory time series of the type classified into the first group.

11. A non-transitory computer-readable storage medium storing a program, applied for quality management in a manufacturing process of a certain product, that causes a computer to execute:
classification processing for classifying a plurality of types of the explanatory time series into a first group or a second group;
selection processing for selecting, as a representative time series, one of the explanatory time series most strongly influencing a change in a value of a response time series from the first group; and
influence degree calculation processing for calculating, an influence degree of another of the explanatory time series of a type, of the types, classified into the second group, on representative time series of a type, of the types, classified into the first group by executing a multivariate analysis in which the other of the explanatory time series in the second group is set as an explanatory variable and the representative time series is set as a response variable,
wherein the explanatory time series comprise a type of time series pertaining to a manufacturing condition, and
the response time series comprises a type of time series pertaining to a quality index of the certain product.

12. The storage medium according to claim 11, wherein the classification processing includes processing for classifying the type, of the representative time series from the first group, as influencing the response time series and into the first group.

13. The storage medium according to claim 11, wherein the classification processing includes processing for classifying the types of the explanatory time series in such a way that an influence of the one of the explanatory time series of the type classified into the first group on the response time series is larger than an influence of the other of the explanatory time series of the type classified into the second group on the response time series by mutual information that can be calculated by using a maximal information coefficient (MIC) or by executing a multivariate analysis.

14. The storage medium according to claim 11, wherein the program further causes the computer to execute:

analysis processing for specifying, as an effect factor having an influence on the response time series, the other of the explanatory time series of the type classified into the second group as comprising the influence of which, on the one of the explanatory time series of the type classified into the first group, is larger than a reference, based on another influence degree on the response time series.

15. The storage medium according to claim 11, wherein the types of the explanatory time series include a type of the explanatory time series of which a change in a value is directly controllable and a type of the explanatory time series of which a change is not directly controllable but is indirectly controllable, the classification processing includes processing for classifying the type of the one of the explanatory time series into the first group as the type of the explanatory time series of which the change in the value is directly controllable, and the influence degree calculation processing includes processing for calculating the influence degree of other of the explanatory time series of the type classified into the second group as on the one of the explanatory time series of the type classified into in the first group.

16. The factor analysis device according to claim 1, wherein the at least one processing device is further configured to execute the instructions to:

classify the plurality of types based one whether one or more of the types satisfy a criterion regarding an influence on the response time series.

17. The factor analysis method according to claim 6, comprising:

classifying the plurality of types based one whether one or more of the types satisfy a criterion regarding an influence on the response time series.

18. The storage medium according to claim 11, wherein the classification processing includes processing for classifying the plurality of types based one whether one or more of the types satisfy a criterion regarding an influence on the response time series.

* * * * *